Patented Jan. 7, 1941

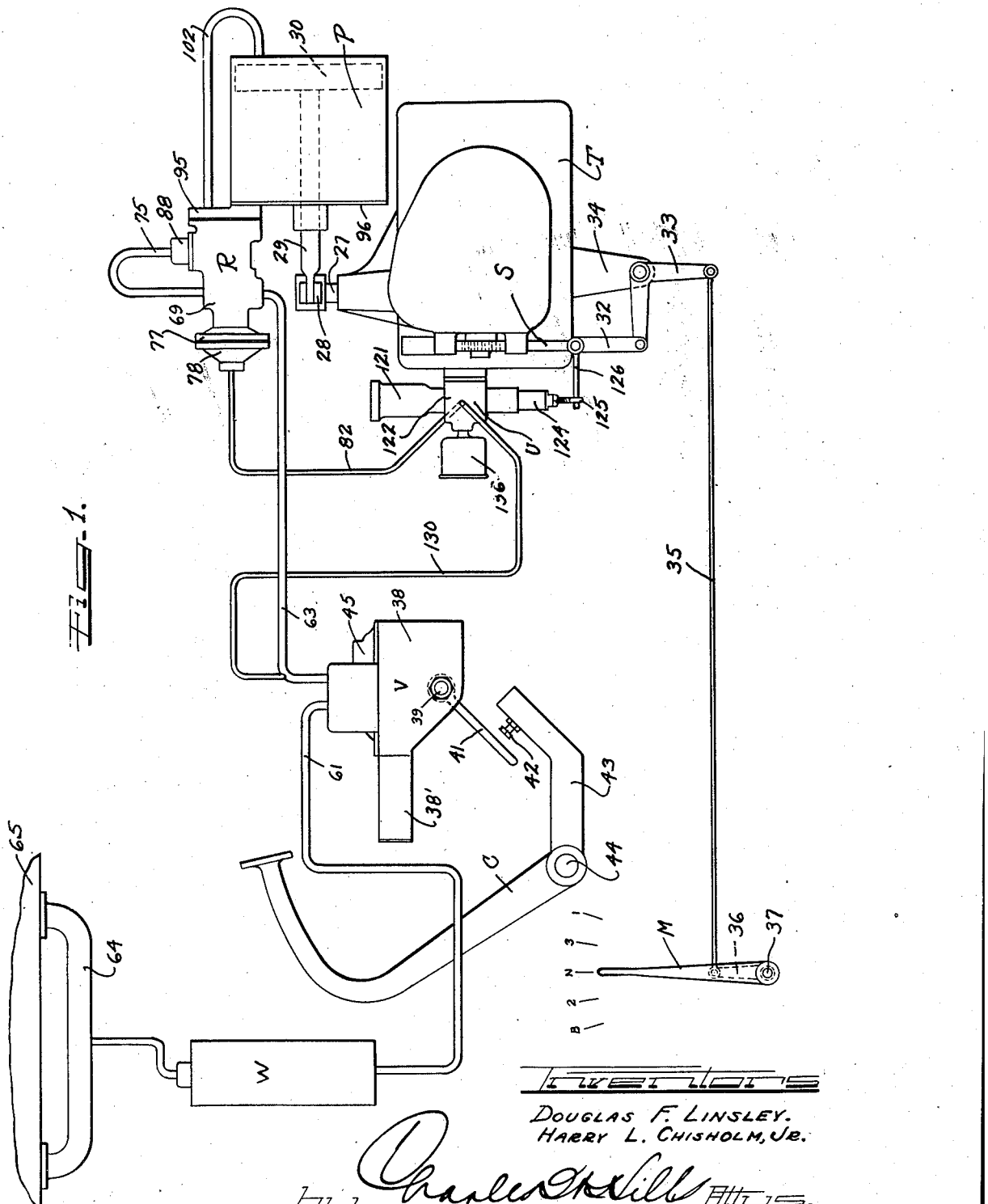

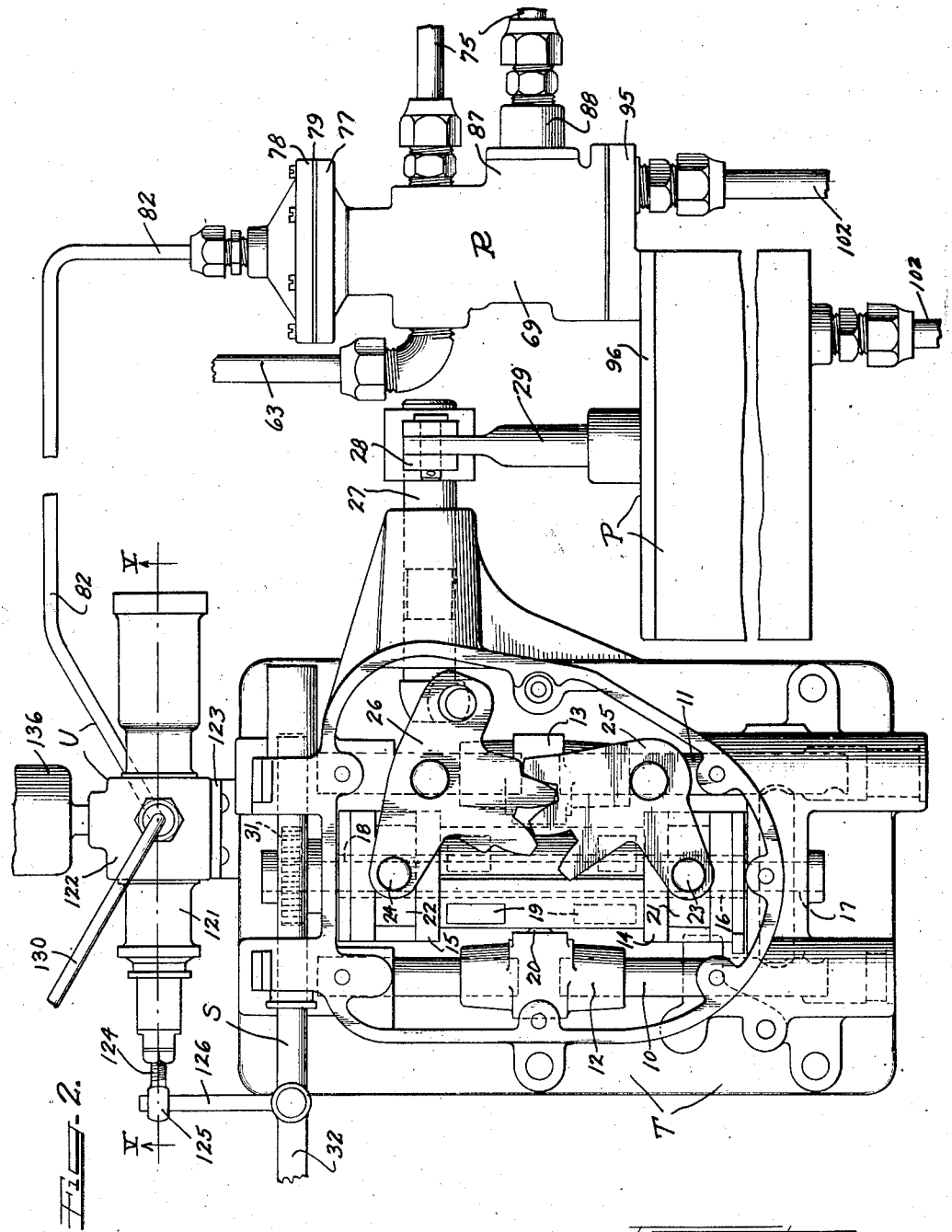

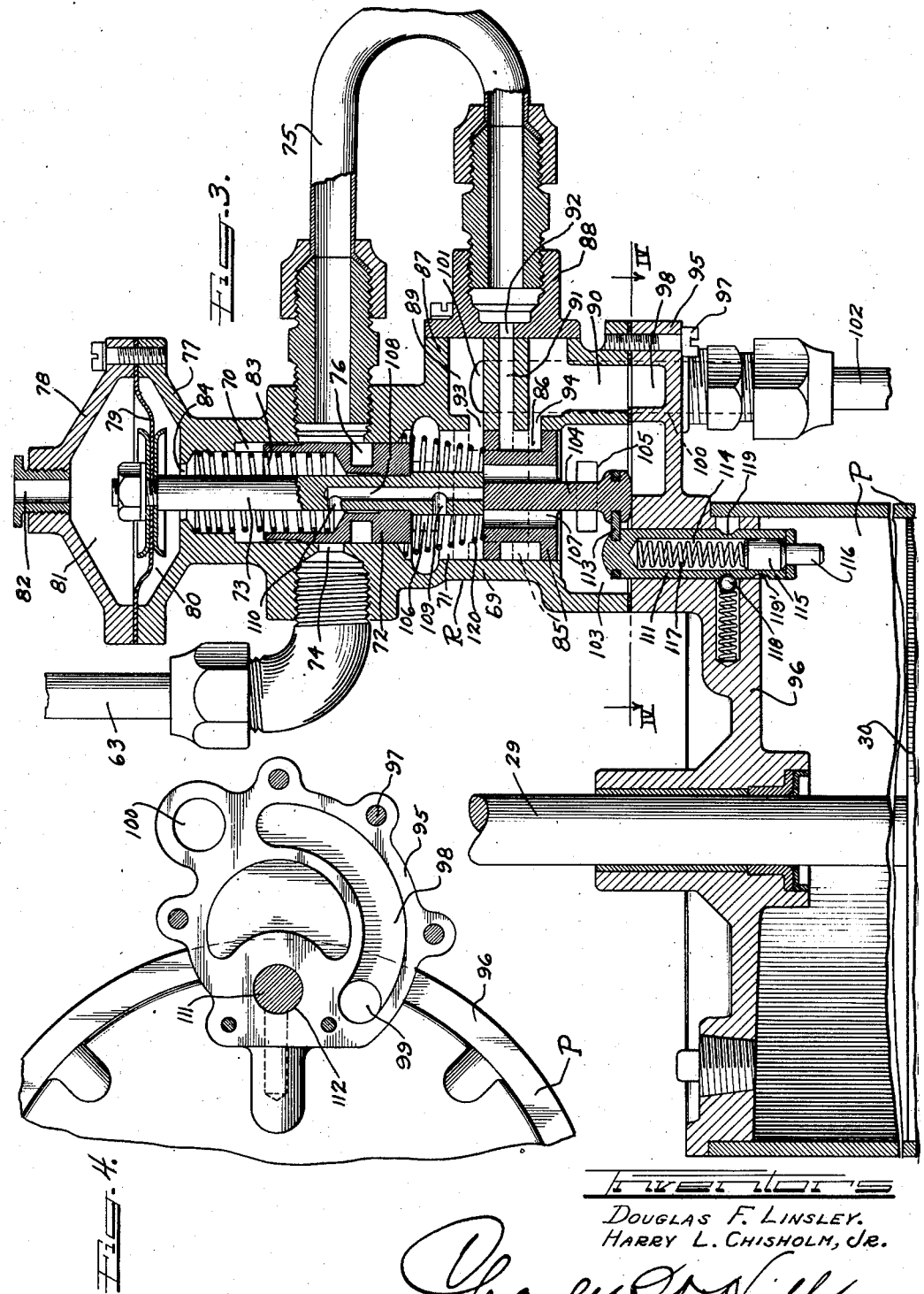

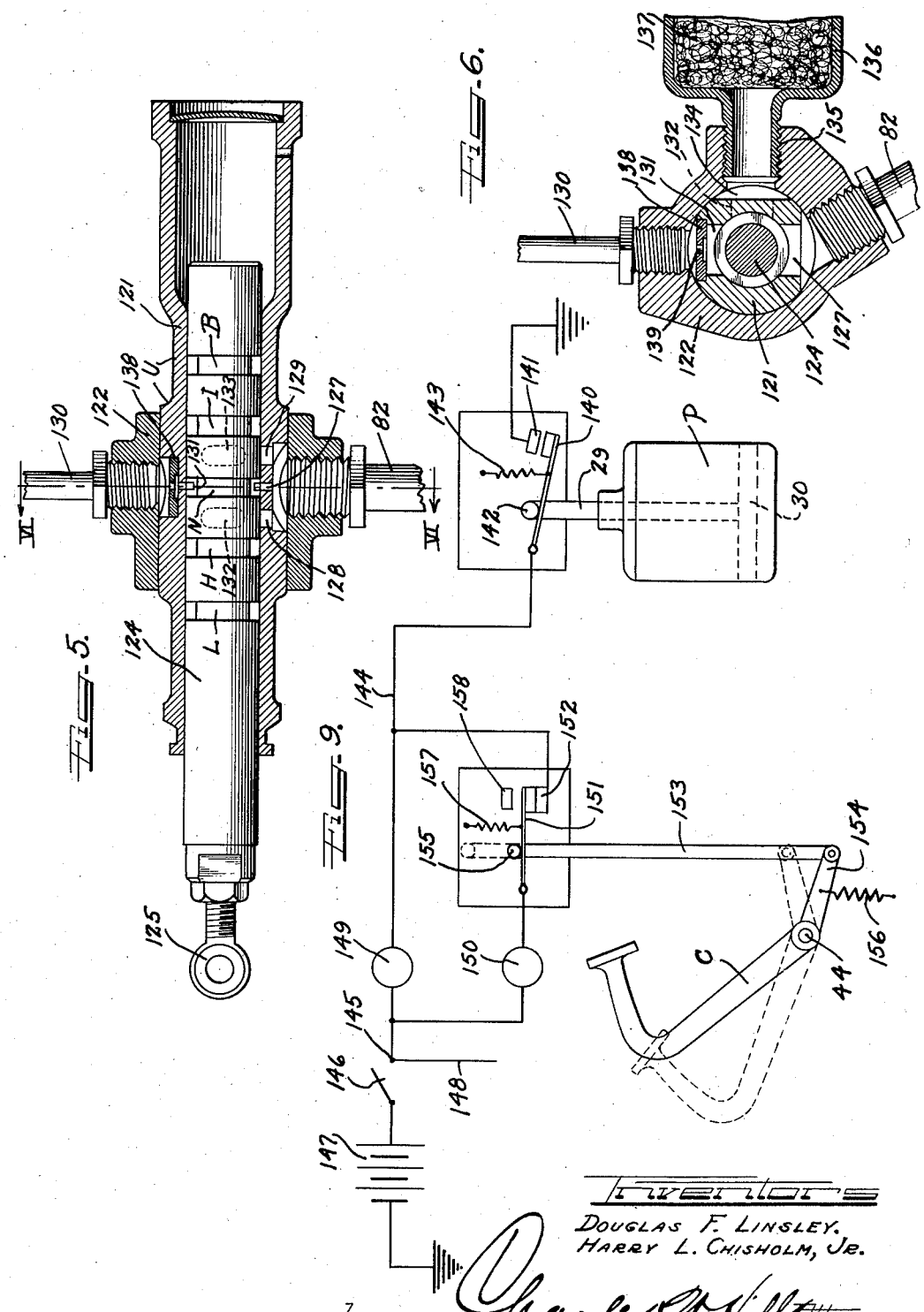

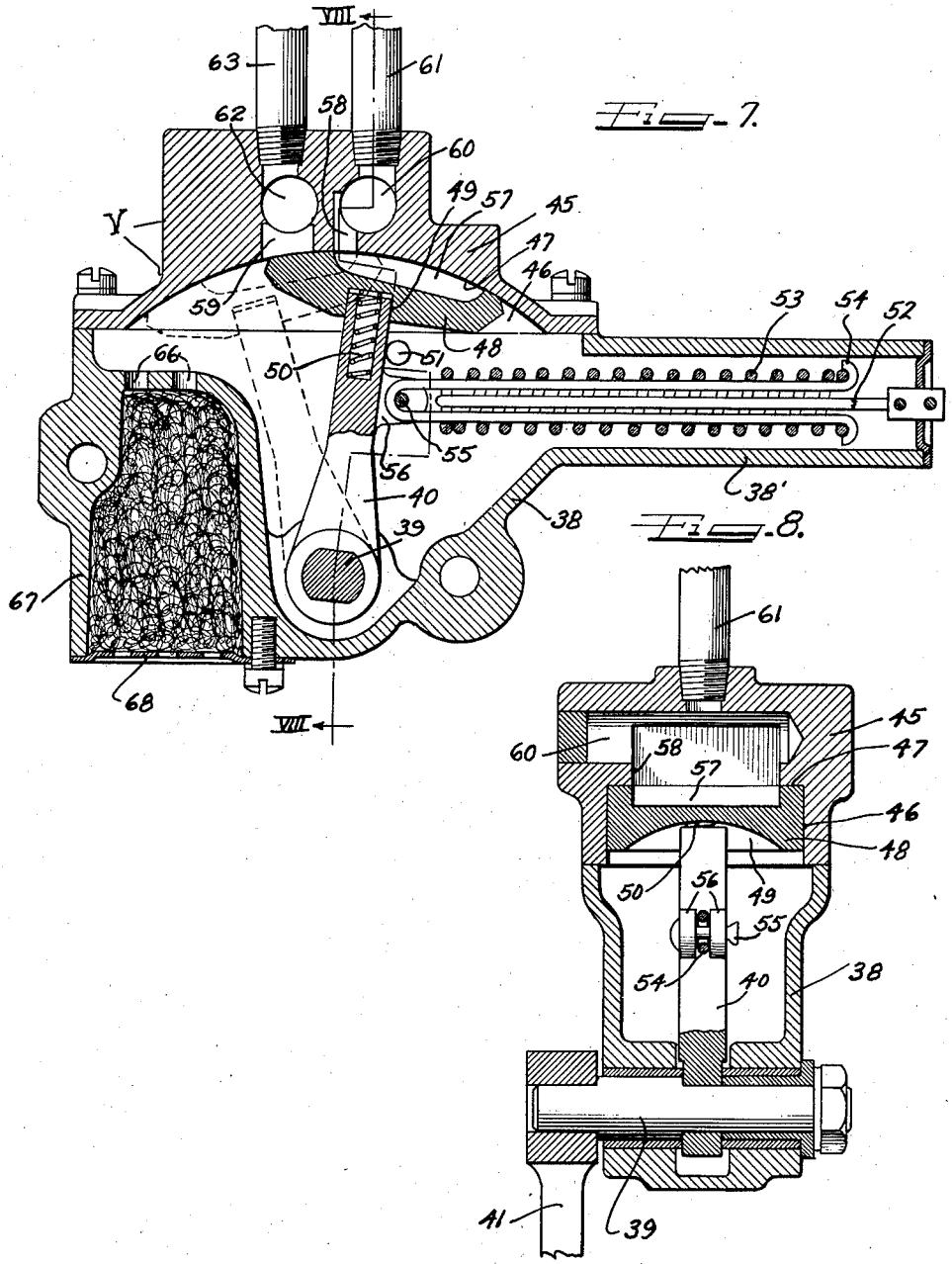

2,227,657

UNITED STATES PATENT OFFICE 2,227,657

TRANSMISSION CONTROL SYSTEM AND MECHANISM

Douglas F. Linsley and Harry L. Chisholm, Jr., Buffalo, N. Y., assignors to Houde Engineering Corporation, Buffalo, N. Y., a corporation of New York Application July 22, 1939, Serial No. 285,918

6 Claims. (Cl. 74—334)

This invention relates to transmission control in automotive vehicles and particularly to that type of control in which selection for desired transmission speed is effected by a hand lever preferably located adjacent to the steering wheel, and the shifting of the selected transmission gearing is effected by power means in which the power medium is preferably the vacuum generated in the engine intake manifold.

In our improved system, a main valve for the vacuum supply is controlled by operation of the clutch pedal, and an important object of the invention is to provide a cut-off valve for controlling the connection of the power cylinder with the vacuum supply from the main valve.

A further important object is to provide means, such as a diaphragm structure, for operating the cut-off valve, and an auxiliary valve for controlling the application of vacuum to and the venting of the diaphragm structure and with the auxiliary valve operable in synchronism with the speed selection means in the transmission housing operable by the selection lever at the steering wheel.

A further important object is the provision of a reversing valve controlled by the movements of the cut-off valve and the piston in the power cylinder in such manner that, at the end of the power piston movement for neutralizing the transmission gearing, the reversing valve will be set to reverse the vacuum flow to the power cylinder for movement of the power piston for shift of selected gearing, and the reversing valve will be shifted back to normal position when the cut-off valve is closed.

Another important object is to provide construction and operation for the auxiliary valve so that its operation synchronously with the setting of the gear selecting means by the hand lever at the steering wheel may so control the operation of the cut-off valve by the diaphragm structure that there can be no vacuum supply to the power cylinder until setting for speed selection is fully completed.

In addition to the above enumerated features, the invention embodies various other important features of construction, arrangement and operation.

The various features of the invention are incorporated in the structure shown on the drawings, in which drawings:

Figure 1 is a diagrammatic layout of our improved control showing the various cooperating structures and the interconnections;

Figure 2 is a plan view showing a transmission housing with the cover removed and showing also the power cylinder, the cut-off and reversing valve structure, and the auxiliary valve structure;

Figure 3 is a diametral section through the cut-off and reversing valve structure and part of the power cylinder;

Figure 4 is a view on plane IV—IV Figure 3;

Figure 5 is an enlarged plan view of the auxiliary valve structure with the valve housing in diametral section;

Figure 6 is a section on plane VI—VI Figure 5;

Figure 7 is a vertical sectional view of the clutch operated valve;

Figure 8 is a section on plane VIII—VIII Figure 7;

Figure 9 is a diagram showing signal circuit arrangement for indicating various conditions of operation of the control system.

Referring to the layout shown on Figure 1, T represents the transmission housing within which are the gear selection and gear shifting assemblies. P indicates the power cylinder for effecting the shifting operation. R indicates the cut-off and reversing valve structure for controlling the application of the power medium, in this case the vacuum generated by the vehicle engine, to the power cylinder P. V indicates the valve structure controlled by operation of the clutch pedal C for controlling the supply of vacuum. M indicates a control lever adjacent the steering wheel of the vehicle for selecting the desired transmission speed ratio. S indicates a selector rack cooperating with means within the transmission casing T for setting the selection assembly for the desired speed ratio. U represents the auxiliary valve for control of the application of vacuum or atmosphere to the cut-off valve in the structure R, the valve U and the selector rack S being conjointly actuated upon manipulation of the selection lever M. W represents a reservoir for vacuum power supply.

The gear selection and shifting assembly within the transmission housing T may be of any suitable type. As shown on Figure 2, it is substantially the same as that disclosed in the copending application of Peo, Chisholm and Linsley, Serial No. 215,776, filed June 25, 1938. Briefly describing this selection and shift assembly, it comprises the shifter rods 10 and 11 carrying the heads 12 and 13 from which extend the shifter forks (not shown). The selector elements 14 and 15 are mounted on a tubular shaft 16 journaled at one end on a fixed pin 17 and at its other end having the pin 18 secured thereto and extending therefrom. As fully described in the co-pending application of Peo, Chisholm and Linsley referred to, the selector elements are rotatable on the tube 16 for selection of a desired speed ratio, and are axially shiftable on the shaft for neutralization of the transmission gearing and shift thereof for the selected speed ratio, the selector elements having the selector notches 19 for receiving the coupling plungers 20 housed in the fork heads 12 and 13. The selector element bodies have respectively circumferentially extending channels 21 and 22 for receiving pins 23 and 24 extending from the gear sectors 25 and 26 pivoted on the transmission housing, the sector 26 being engaged by a crankshaft 27 extending laterally from the transmission housing and at its outer end provided with a lever 28 connected with the rod 29 extending from the piston 30 within the power cylinder P. Normally the piston is at the rear end of the cylinder and the selector elements are separated as shown on Figure 2, a forward stroke of the piston causing the selector elements to be brought together and the fork heads returned to neutral and a selector notch 19 brought into alignment to receive the corresponding coupling plunger 20, and the rearward stroke of the piston causing the selector elements to be shifted apart and the coupled fork head carried therewith for shift into the selected gear ratio.

For rotational setting of the selector elements for gear selection, the selector rack S meshes a gear sector 31 secured on the pin 18 which is fastened to the tubular shaft 16. As best shown on Figure 1, the selector rack is connected by a link 32 with one end of a bell crank lever 33 pivoted on a bracket 34 extending from the transmission housing, the other end of the lever being connected by the rod 35 to an arm 36 extending from the lower end of the shaft 37 at the upper end of which is secured the manually operable selection lever M adjacent to the steering wheel.

The clutch pedal operable valve V is shown on Figures 7 and 8. It comprises a substantially V-shaped body 38 at the apex of which is journaled the shaft 39 from which the valve arm 40 extends, the shaft 39 at its outer end having secured thereto the operating lever 41 which, as shown on Figure 1, is in the path of an adjustable abutment post 42 on an arm 43 extending from the shaft 44 on which the clutch lever C is mounted.

The detachable cover 45 for the valve body provides the valve chamber 46 having the seat 47 whose curvature is centered at the axis of the shaft 39, the seat being engaged by the valve shoe 48 movable with the arm 40. As shown the end of the arm extends into the recess 49 of the valve shoe, the spring 50 within the arm tending to yieldably hold the valve to its seat as the arm is swung.

The valve body has the tubular extension 38' for accommodating a spring for normally holding the valve arm against a stop 51. As shown a rod structure 52 extends through the extension from the head thereof to form a seat for the inner end of a compression spring 53 which at its outer end abuts the hook ends 54 of a hairpin frame whose bend receives a pin 55 extending between ears 56 on the valve arm 40, the spring thus yieldingly holding the valve arm normally against the stop 51.

The valve shoe has the rectangular port 57 for cooperating with the rectangular ports 58 and 59 in the cap 45 and terminating at the surface 47 along which the valve shoe operates. The port 58 leads to a bore 60 with which a pipe 61 communicates, and the port 59 leads to a bore 62 with which a pipe 63 communicates. As shown on Figure 1, the pipe 61 to the valve V extends from the reservoir W which is connected with the intake manifold 64 of the vehicle engine 65. The pipe 63 extends to the cut-off and reverse valve structure R.

Referring to Figure 7, the valve body 38 has air inlets 66 so that the interior of the housing is normally subjected to atmospheric pressure, and to guard against dust or dirt entering with the air, the valve body has an enlargement 67 forming a filter chamber for filtering material 68 in advance of the inlets 66.

In the normal position of the valve shoe with the arm 40 against the stop 51, the valve port 57 registers with the vacuum port 58, the heel of the valve shoe partially overlapping the port 59 so that air may flow through the pipe 63 for venting of chambers previously subjected to vacuum. When the valve arm 40 is swung away from its normal position, the valve shoe will shut off the port 59 from atmosphere and the valve port 57 will span the ports 58 and 59 for delivery of vacuum from the pipe 61 to the pipe 63 and to the various control elements to be operated. As soon as the valve is returned to its normal setting, these elements will be vented to atmosphere. On Figure 7 the full lines show the valve in normal position and the dotted lines show it in its position for spanning the ports 58 and 59. Referring to Figure 1, the abutment post 42 is so set that upon depression of the clutch pedal C, the arm 41 will not be actuated for valve movement until the clutch has been fully disengaged.

The cut-off and reversing valve structure is best shown on Figures 3 and 4. The structure comprises a body 69 having the outer longitudinal bore 70, and the inner bore 71 concentric with the bore 70 but of somewhat larger diameter. Operable within the bore 70 is the cut-off valve 72 secured on a stem 73 which extends through the bore 70 and into the bore 71. Communicating with the bore or valve chamber 70 is the port 74 with which connects the pipe 63 extended from the clutch operated valve V. The bore or valve chamber 70 also communicates with a pipe 75 extending therefrom opposite the port 74. The valve 72 has a circumferentially extending port 76 for connecting the pipe 75 with the port 74 when the valve is shifted outwardly from its normal position. At its outer end, the valve body 69 has a flaring extension 77 covered by a cap 78, a diaphragm 79 being interposed between the extension and the cap to form inner and outer chambers 80 and 81, the stem 73 of the valve 72 being secured at its outer end to the diaphragm. A pipe 82 extends from the outer chamber 81 for the application of vacuum or atmosphere in the chamber. A spring 83 nested in the outer end of the valve and abutting the body 69 at its outer end tends to hold the valve in its normal or inner position with the valve port 76 displaced from the port 74, the valve chamber 70 communicating with the inner diaphragm chamber 80 through the passage 84. Upon the application of vacuum in the outer diaphragm chamber 81, the valve will be shifted outwardly for connection by its port 76 of the pipe 63 with the pipe 75.

The bore 71 forms a chamber for the reversing valve 85, this valve being cylindrical and having the circumferentially extending port 86 intermediate its ends. At one side of the valve chamber 71 the valve body has the enlargement 87 covered by a cap 88 and providing outer and inner chambers 89 and 90. A port 91 extends through the enlargement to connect the valve chamber 71 with the passage 92 in the cap 88 which communicates with the pipe 75 extending from the valve chamber 70 for the cut-off valve. Adjacent to the port 91, a port 93 connects the chamber 89 with the valve chamber 71 at the inner side of the valve 85, and a port 94 connects the chamber 90 with the valve port 86 when the valve is in its normal position as shown in Figure 3.

The valve body 69 is supported by a bracket or wall 95 extending radially from the outer head 96 of the power cylinder P, the valve body being detachably secured as by means of screws 97. In the outer side of the wall 95 is an arcuate channel 98 communicating at one end with the chamber 90 and at its other end with a passage 99 through the cylinder head 96 and to the forward end of the cylinder. The wall 95 has also the passageway 100 therethrough registering at its outer end with the passageway 101 extending through the enlargement 87 and terminating in the chamber 89, the outer end of the passageway 100 communicating with a pipe 102, this pipe leading to the rear end of the power cylinder behind the piston 30.

Between the wall 95 and the valve chamber 71, the valve body 69 has the chamber 103 into which extends the stem 104 of the reversing valve 85. This chamber 103 is connected by a passageway 105 to receive air under atmospheric pressure. Another passageway 106 connects the inner end of the valve chamber 71 with the atmosphere, and the incoming air may be cleaned by suitable filtering means (not shown). Through the reversing valve 85 are longitudinally extending passageways 107 so that the chamber 103 and the inner end of the valve chamber 71 are always in communication.

The stem 73 for the cut-off valve has the bore 108 through its inner end connected with the outer end of the valve chamber 71 by the port 106 and connected by a port 110 with the valve chamber 70 outside of the valve 72.

When the cut-off and reversing valve parts are in normal position as shown on Figure 3, the stem 73 of the cut-off valve is forced inwardly by the spring 83 to abut the reversing valve 85 to hold the end of the stem 104 against the wall 95, the reversing valve in this position having its port 86 spanning the ports 91 and 94. If now vacuum is applied in the outer diaphragm chamber 81, the cut-off valve 72 will be shifted outwardly for connection by its port 76 of the vacuum pipe 63 with the pipe 75 which communicates with the port 91, and the outer end of the power cylinder will be subjected to vacuum through the chamber 90, the arcuate passageway 98, and the passageway 99, and the piston will be shifted forwardly in the cylinder for bringing the selector elements 14 and 15 in the transmission housing together and to bring the shifter forks to neutral position ready for a shift of the selected gearing. An important object of our invention is to provide means, automatically operated during the final forward movement of the piston in the power cylinder, for quickly shifting the reversing valve to disconnect the forward end of the power cylinder from vacuum and to connect the inner end of the cylinder with vacuum so that the piston will be pulled back to effect the shifting of the selected transmission gearing. Referring to Figure 3, this valve shifting means is in the form of a plunger assembly comprising a cylindrical shifter bar 111 which is shiftable in the passageway 112 in the cylinder head 96 to project into the chamber 103 where it is connected by a tie bar 113 with the end of the stem 104 on the reversing valve 85. The bar has the bore 114 for a plunger 115, from which a pin 116 extends out through the inner end of the 10 bar, the spring 117 within the bore tending to hold the plunger in its outer position. When the parts are in their normal positions as shown on Figure 3, a spring pressed detent ball 118 engages in the detent channel 119 in the bar 111 to resist outward movement thereof. During the final outward movement of the piston in the power cylinder, the piston will first engage with the pin 116 and will force the plunger 115 inwardly against the resistance of the spring 117 and then when the piston, during its final outward travel, engages the shift bar 111, it will release the bar from the detent ball 118, and the spring 117 will then quickly shift and snap the bar inwardly for snap shift of the reversing valve 85 into its outer position, indicated by dotted lines in Figure 3. In this outwardly shifted position of the reversing valve, its port 86 will span the port 92 and the port 93 so that the outer end of the cylinder will be subjected to vacuum through the passageway 101 in the valve body 69, the passageway 100 in the wall 95, and then the pipe 102 connecting with the rear end of the cylinder. Thus, after an outward movement of the piston for neutralizing the gears and connection of the respective selector elements with the fork head of the selected gear, the piston itself will set the reversing valve for flow of vacuum for returning the piston to its inner position for shift of the selected gear. In order that complete and effective neutralization may be effected before shifting, the shifter bar 111 is provided with a second channel 119' to be engaged by the detent ball 118 when the bar has been shifted outwardly for shifting of the reversing valve.

A neutralization followed by a shifting by the power cylinder occurs while the outer diaphragm chamber 81 is subjected to vacuum. By means of the auxiliary valve structure U, which will be described in detail later, the diaphragm chamber 81 is vented to atmosphere when the manual selecting lever M (Figure 1) is shifted from one index setting to another, and when the diaphragm is thus released from vacuum, the spring 83 will shift the cut-off valve 72 back to its normal position, and in such movement of the valve, its stem 73 will encounter the reversing valve 85 and will shift this valve back to its normal position, the cut-off valve during its movement cutting off the vacuum pipe 63 from the pipe 75. A spring 120 is interposed between the reversing valve and the valve body 69 which spring is compressed when the reversing valve is shifted outwardly by the engagement of the power cylinder piston with the shift bar 111, but the spring pressed detent ball 118 engaging in the channel 119' in the shift bar when it is shifted out will hold the reversing valve in its shifted position against the efforts of the spring 120. However, when the spring 83 shifts the cut-off valve 72 and its stem 73 back to the normal position and carries therewith the reversing valve, the detent channel 119' of the shift bar 111 will be released from the detent ball 118 and then the spring 120 will quickly snap the reversing valve back to its normal position and restore the shift bar 111 to its inner position ready for the next engagement therewith by the power cylinder piston. When the selection by the manual lever M for succeeding speed is completed, the outer diaphragm chamber 81 will again be subjected to vacuum and the cut-off valve drawn out for connection of the vacuum pipe 63 with the pipe 75 and the outer end of the cylinder will be subjected to vacuum for outward travel of the piston and engagement of the piston with the shift bar 111 for setting of the reversing valve for the application of vacuum to the inner end of the cylinder so that neutralization of the gearing is quickly followed by shift of the selected gearing.

When the outer end of the power cylinder is subjected to vacuum, the inner end thereof is open to the atmosphere through the pipe 102 which then communicates through the passageway 101 and the port 93, with the inner end of the valve chamber 71 which is connected with atmosphere through the atmosphere inlet 106. When the inner end of the power cylinder is subjected to vacuum, the outer end thereof is open to the atmosphere by way of the passageway 98, the chamber 90, port 94 and the chamber 103 which has the atmosphere inlet 105. The diaphragm 79 is also always free to move in response to vacuum as the diaphragm chamber 80 is always in communication through the valve stem bore 108 with the outer end of the valve chamber 71 which has the atmosphere inlet 106.

The auxiliary valve structure U is shown in detail in Figures 5 and 6. It comprises a tubular valve housing 121 supported in a collar 122 which may be secured to a bracket 123 (Figure 2) extending from the transmission housing T, the axis of the valve housing being parallel with that of the selector rack bar F on the transmission housing. Shiftable within the valve housing is the cylindrical auxiliary valve 124 which at its outer end has an eye 125 receiving the end of an arm 126 rigid with and extending from the inner end of the link 32 which connects the selector rack S with the lever 33 (Figure 1). With this arrangement, the auxiliary valve shifts with and follows the movements of the selector rack S as the manual setting lever M is operated. The purpose of this auxiliary valve is to operate coincidentally with the setting of the speed selector rack S to control the application of vacuum to the diaphragm chamber 81 for opening of the cut-off valve 72, and the application of atmosphere to this diaphragm chamber for closure of the cut-off valve when passing from one selection index position to another. The pipe 82 to the diaphragm chamber 81 communicates with the bore of the valve housing 121 through a vacuum port 127 and through atmosphere ports 128 and 129. Referring to Figure 1, the pipe 130 extends from the vacuum supply pipe 63 and communicates with the valve housing bore through a port 131.

The valve 124 has a number of circumferential channels or ports equally spaced apart. Referring to Figure 5, the valve has five such ports designated L, H, N, I, and B, the ports being for selection respectively, for low speed, high speed, neutral, intermediate speed, and reverse. The ports 127 and 131 in the valve housing 121 are shown diametrically opposite, and the spacing between the atmosphere ports 128 and 129 in the valve housing is equal to the spacing between the valve ports. The valve housing has two other ports 132 and 133 circumferentially displaced from the ports 128 and 129 respectively but in circumferential alignment therewith so as to communicate therewith when the valve 124 is shifted for closure of the port 127 and registration of adjacent valve selection ports with the ports 128 and 129. Referring to Figure 6, the valve housing is cut away to provide a recess 134 connecting the ports 132 and 133, and this recess communicates with an atmosphere inlet 135 provided on the collar 122. In order to assure the entrance of clean air, a filter cup 136 may be applied in the inlet 135 and filled with filter material 137.

As shown in Figure 1, the manual selection lever M is set at the N or neutral index position, and the selector rack S is therefore at neutral setting, and the auxiliary valve 124 is likewise at neutral setting as shown on Figure 5. As shown on Figure 3, the cut-off valve 72 is closed. If the clutch pedal C is now depressed, first to disengage the clutch and then to swing the valve arm 41 for opening of the valve V, the diaphragm chamber 81 will be subjected to vacuum through the pipe 130, ports 131, N and 127 of the auxiliary valve U, and pipe 82. The cut-off valve 72 will then be shifted outwardly to open position so that vacuum will be transmitted through the valve and through pipe 72 and the reversing valve 85 to the forward end of the power piston, and a power cycle will result as has already been described. However, as the selector elements 14 and 15 are at neutral setting, the transmission gearing will remain at neutral and there will be no gear shifting.

If setting of the manual lever M is made to another index position, the auxiliary valve 124 will be correspondingly shifted, and during such shift from one index position to another, the ports 127 and 131 on the auxiliary valve will be closed and two of the valve ports will be in registration with the atmosphere ports 128 and 129 to subject the diaphragm chamber 81 to atmosphere for release of the cut-off valve and return thereof to closed position. When the new index position is reached, this atmosphere path will be closed and the vacuum ports 127 and 131 again put into communication so that when the clutch pedal is depressed for opening of the valve V, the cut-off valve 72 will be opened for application of vacuum to the power cylinder for a cycle of gear neutralization and shift. For example, suppose that low speed drive is desired, the lever M is moved to the low speed index for setting of the selector rack S and the elements for that speed, and the auxiliary valve 124 will be correspondingly set for communication of its L port with the ports 127 and 131 for delivery of vacuum to the diaphragm and opening of the cut-off valve 72. During such setting movement from neutral to low speed before depression of the clutch pedal and opening of the valve V, the diaphragm chamber 81 will be twice vented to atmosphere and the cut-off valve will remain closed, but at the end of the setting for low speed and depression of the clutch pedal for opening of the valve V, the vacuum will first open the cut-off valve and then vacuum will be communicated to the power cylinder for a cycle of operation thereby to shift to the selected speed.

It will be noted that the ports 127 and 131 are in the form of circumferentially extending slots which are rather narrow but comparatively long and are therefore adapted for fast opening to effect positive diaphragm operation of the cut-off valve for vacuum flow for operation of the power cylinder. With the auxiliary valve arrangement shown, the vacuum supply ports are opened just before the valve reaches a new setting and then the vacuum effect will be quickly transmitted by the ports to the diaphragm for opening of the cut-off valve. While the auxiliary valve is moving toward a new index setting, the atmosphere ports which are of large area permit quick venting of the diaphragm chamber for quick closure of the cut-off valve which then remains closed until the vacuum ports are exposed by the auxiliary valve 124 during the final movement thereof. This will prevent operation of the power piston except when the index position of the auxiliary valve has been reached and the operator desires the shift to occur. The cut-off valve 72 is thus under direct control of the operator and functions to shut out the main vacuum supply to the power cylinder until operation of the power cylinder is desired.

Either pre-selection or post selection may be used. When pre-selecting, the auxiliary valve 124 is set for operation by the setting lever M and then when the clutch pedal is depressed for opening of the valve V, vacuum will open the cut-off valve 72 for vacuum supply to the power cylinder for shift to the selected speed.

When post selecting, the clutch lever is depressed for opening of the valve V, and then gear selection and setting of the auxiliary valve 124 is made by the lever M for vacuum flow to the diaphragm for opening of the cut-off valve 72 and application of vacuum to the power cylinder. While the clutch is held and disengaged, selection for any speed may be made and the power cylinder will operate.

Referring to Figure 1, the setting of the abutment 42 on the arm 43 operated by depression of the clutch lever C is such that the operating arm 41 for the valve 48 (Figure 7) will not be actuated until the clutch pedal has been depressed a distance beyond its movement for complete clutch disengagement. It will therefore be impossible to shift gears until the clutch is fully disengaged. It will also be noted that due to the rectangular valve port 57 and the rectangular ports 58 and 59, the valve has a fast straight line opening for rapid application of vacuum for operation of the power cylinder as soon as the cut-off valve 72 is opened.

In the control system described, the operator may hold the clutch pedal depressed and keep the valve V open, and then by manual lever M change the speed setting from one speed to another. Means are provided so that the movement from one index position to another may be at a normal rate without the diaphragm being operated quickly enough for the piston to start a shift cycle. Referring to Figures 5 and 6, a disk 138 is interposed between the vacuum pipe 130 and the port 131 of the auxiliary valve, this disk being provided with a metering orifice 139 for retarding the application of vacuum to the diaphragm chamber 81 to retard the operation of the diaphragm sufficiently to prevent occurrence of a shift cycle before the desired setting is reached.

Referring to Figure 1, the vacuum supply pipe 130 to the auxiliary valve is connected with the vacuum supply line 63 to the cut-off valve, and the supply of vacuum to the auxiliary valve is controlled by the clutch operated valve V. When this valve is open, the supply line 63 is vented to atmosphere through the body of the valve V.

When the auxiliary valve 124 is in any neutral or speed setting, the atmosphere vent of said valve will be closed and the diaphragm chamber will then be vented through the valve V when this valve is closed. However, during shift of the auxiliary valve from one index point to another, the diaphragm chamber will be vented directly through the atmosphere ports of the auxiliary valve. Therefore when the auxiliary valve is in neutral or in any speed set position, the valve V may be opened and closed by operation of the clutch pedal for repeated shift cycles of the power cylinder.

In the case of abutment of gears, that is, if the power piston cylinder is unable to complete its shift movement after the clutch pedal has been depressed for opening of the valve V, the clutch pedal may be released for closure of the valve V and venting of the valve and chamber 81 to atmosphere and then when the pedal is again depressed for opening of the valve V, the piston will start a new cycle for gear neutralization and shift, and regardless of whether or not the hand selector lever M has been moved.

Figure 9 shows a circuit arrangement for indicating various conditions for assuring proper manipulation of the piston.

A switch comprising a switch blade 140 is mounted for movement by the power cylinder piston and for cooperation with a contact 141 which is connected with the ground. A suitable abutment 142 may be provided for movement with the piston rod 29 which abutment engages the switch blade 140 to disconnect it from the contact 141 when the piston is at the inner end of its stroke after a complete shift cycle, a spring 143 tending to move the switch blade into engagement with the contact. The switch blade is connected by conductor 144 with the contact 145 of a switch 146 which may be the ignition switch whose blade is connected through a battery 147 with ground, the ignition circuit 148 extending from the switch contact 145. The conductor 144 includes a signal device which may be a lamp 149.

For operation of the power cylinder, the operator first depresses the clutch pedal C to effect complete disengagement of the clutch and then to open the valve V for vacuum supply to the power cylinder. As soon as the power piston starts to move outwardly, the abutment 142 will be released from the switch blade 140 which will then engage the contact 141 for closure of the circuit which includes the signal lamp 149 it being understood that the ignition switch 146 is closed before the system is operated. So long as the lamp 149 is lit, the operator knows that the power cylinder piston has not yet returned to its innermost position for full completion of the shift stroke and he does not therefore release the pedal C for clutch engagement. As soon as the piston has completed its full inward travel, the switch blade 140 will be disconnected from the contact 141 and the lamp 149 will go out, and the operator knows that it is then safe to engage the clutch.

For further precaution, an additional signaling circuit may be provided in bridge of the signal lamp 149 and including a signal device 150 and a switch comprising a switch blade 151 and a contact 152, and the signal 150 may be an audible signal such as a buzzer. A rod 153 extends upwardly from the end of an arm 154 on the clutch lever supporting shaft 44, and above the switch blade 151 the rod has an abutment 155 which, when the clutch is engaged, holds the switch blade in engagement with its contact 152, 156 indicating the spring which tends to move the clutch lever to clutch engaging position. When the clutch lever is depressed for clutch disengagement, the rod 153 is raised and the switch blade will be released from its contact 142 by the spring 157 and held against a stop 158.

When the operator closes the ignition switch 146 for operation of the vehicle, and the power piston is at the end of a shift stroke, the switch blade 140 will be disconnected from the contact 141 and there will be no current flow to either of the signaling devices 149 and 150 and the operator then knows that it will be safe to depress the clutch pedal for opening of the valve V for supply of vacuum to the power cylinder. However, should the power piston not be fully in and the gear shift last made was incomplete, the switch spring 140 and contact 141 will be in engagement and the lamp 149 will be lit and the buzzer or other audible signal device 150 will sound, thus warning the operator.

As explained before, the abutting gears or other conditions may have prevented the power piston from fully completing the shift, and the operator can then depress the clutch pedal for opening of the valve V and another cycle of operation of the power piston, and if the power cylinder then functions properly, the signals will so indicate, and it will be safe for the operator to engage the clutch. It will be noted that, with the vacuum circuit arrangement shown by Figure 1, the main valve V controls the venting of the diaphragm chamber 81 and therefore the closing moment of the cut-off valve and resetting thereof of the reversing valve 85 to normal position, and therefore the valve V may be closed and opened for operation cycle of the power cylinder until the power cylinder functions properly.

If, after the ignition switch is closed, the signals show the power cylinder in proper condition, he will depress the clutch pedal for unclutching, and opening of the valve V, and as soon as the power cylinder operates, the signal lamp 149 will light to indicate that the power cylinder has started operating. Upon depression of the clutch pedal, the rod 152 will be raised to release the switch blade 151 and to open the circuit to the audible signal 150, and should the operator attempt to engage the clutch before the power cylinder cycle has been fully completed, the switch will be closed by the downward movement of the rod 153 and the signal 150 will sound to warn the operator and he will then depress the clutch pedal for reopening of the valve V and completion of the power cylinder cycle.

We have thus produced a comparatively simple yet very efficient control system for the transmission gearing in automotive vehicles. By means of the auxiliary valve operating in synchronism with the setting of the selection means at the transmission, the operator has at all times full control of the cut-off valve which in turn controls the supply of vacuum to the power cylinder and in conjunction with the power cylinder piston controls the reversing valve. By means of the reversing valve and its snap operation by the power cylinder piston movement, the power cylinder shift operation automatically substantially immediately follows the gear synchronization operation of the power cylinder. By the operator's control of the application of vacuum or atmosphere at the diaphragm structure which operates the cut-off valve, engagement of the clutch cannot result until the power cylinder has fully completed its shift stroke for complete shifting of the gears to a selected speed. Should the power cylinder at any time fail to fully complete a shift, proper operating conditions can be quickly restored without strain or injury to any of the operating elements.

We have shown a practical and efficient embodiment of the various features of our invention but we do not desire to be limited to the exact construction, arrangement and operation shown and described as changes and modifications may be made without departing from the scope of the invention.

We claim as our invention:

1. An automotive vehicle transmission control system comprising gear selection means and gear shifting means for the transmission gearing of the vehicle, setting means for manually setting said selection means for the desired transmission speed, a power cylinder operable by vacuum from the vehicle engine for actuating the gear shifting means, a vacuum supply line, a main valve for controlling the connection of the engine vacuum with said supply line, a cut-off valve controlling the connection of the supply line with the cylinder, a spring normally holding said cut-off valve closed, a diaphragm structure connected with said cut-off valve, an auxiliary valve operable in synchronism with the setting of said selection means to connect said diaphragm structure with the supply line when the selection means is set to a gear selection point whereby said diaphragm structure will be effective to open said cut-off valve, and to vent said diaphragm structure to atmosphere while the selection means is moving from one gear selection point to another whereby said spring may then close said cut-off valve, a reversing valve between said cut-off valve and said cylinder normally positioned to direct vacuum to one end of the cylinder for movement of the cylinder piston to neutralize the transmission gearing, means actuated by the piston at the end of its neutralizing movement for shifting said reversing valve to apply vacuum to the other end of the cylinder for movement of the piston to effect gear shift for the selected speed, and means controlled upon movement of said cut-off valve to closing position for resetting said reversing valve to its normal position.

2. An automotive vehicle transmission control system comprising gear selection means and gear shifting means, a power cylinder for operating the shifting means, a vacuum supply line, a main valve controlling the connection of said supply line with a source of vacuum, setting means for setting the selection means for desired transmission speeds, a cut-off valve interposed between said supply line and said power cylinder, and means operable in synchronism with the setting of the selection means for controlling the movement of said cut-off valve for application of vacuum from the supply line to the power cylinder, operation of said power cylinder in one direction causing neutralization of the transmission gears and when operated in the reverse direction causing shifting into gear of the selected gears, a reversing valve between said cut-off valve and the power cylinder normally positioned for flow of vacuum to the power cylinder for a gear neutralizing operation thereof, and means operated by the power cylinder at the end of its neutralizing operation for setting said reversing valve for flow of vacuum for causing reverse operation of the power cylinder for shift of the selected gearing into gear.

3. An automotive vehicle transmission control system comprising gear selection means and gear shifting means for the vehicle transmission gearing, a power cylinder for actuating the shifting means, a vacuum supply line, a main valve controlled by operation of the vehicle clutch pedal for connecting said supply line with a source of vacuum, a cut-off valve for controlling the connection of the supply line with said power cylinder, a vacuum operable device for controlling the opening and closing of said cut-off valve, a manually operable speed selection lever remote from the vehicle transmission, a setting member at the transmission operable by said lever for setting of the selection means for the desired speed, and an auxiliary valve operable by said lever in synchronism with said setting member for supplying vacuum to said vacuum operated device for operation thereof to open said cut-off valve for application of vacuum to the power cylinder synchronously with the setting of the selection means at any speed setting or at neutral and for operation of said device to close said cut-off valve during passage of the selection means from one speed setting to another.

4. An automotive vehicle transmission control system comprising gear selection means and gear shifting means for the vehicle transmission gearing, a power cylinder for actuating the shifting means, a vacuum supply line, a main valve controlling the connection of said supply line with a vacuum source, a cut-off valve controlling the connection of said supply line with the power cylinder, a reversing valve, a device connected with said cut-off valve and operable by vacuum to open said valve for application of vacuum through the reversing valve to the power cylinder, said reversing valve being normally in position for application of vacuum to the power cylinder for operation of the power cylinder for gear neutralization, means operable by the movement of the power cylinder piston at the end of its gear neutralization movement for setting said reversing valve for application of vacuum to the power cylinder for operation thereof to shift the selected gearing into gear, an auxiliary valve operable in synchronism with the selection means to control the application of vacuum to said vacuum operable device for opening of the cut-off valve and for venting said device, and means effective when said device is vented for resetting said cut-off valve to closed position and for resetting the reversing valve to its normal position.

5. An automotive vehicle transmission control system comprising a power cylinder for shifting selected gearing, a power medium supply line, a supply valve for connecting the supply line with said power cylinder, a reversing valve between said supply valve and the power cylinder and normally set for application of the power medium to the power cylinder for operation of the power cylinder to effect gear neutralization, means actuated at the end of the power cylinder neutralization operation for setting said reversing valve for application of the power medium to the cylinder for shifting operation thereby of the selected gearing into gear, and means effective upon closing movement of said supply valve for resetting said reversing valve to its normal position.

6. An automotive vehicle transmission control system comprising gear shifting means for the vehicle transmission gearing, a power cylinder for actuating the shifting means, a power medium supply, a supply valve for controlling the connection of said supply with said power cylinder, a reversing valve between said supply valve and said power cylinder for controlling the direction of flow of said power medium into the power cylinder when said supply valve is open, said reversing valve being normally set for flow of the medium to the power cylinder for operation of the power cylinder to effect neutralization of the transmission gearing, means operated by the power cylinder piston at the end of a neutralizing operation for snapping said reversing valve into position to reverse the flow of the medium into the power cylinder for operation of the power cylinder to shift selected gearing into gear, and means controlled by the closing movement of said supply valve for resetting said reversing valve to normal position.

DOUGLAS F. LINSLEY.
HARRY L. CHISHOLM, Jr.